SUPERCONDUCTING DEVICE OF VARYING DIMENSION HAVING A MINIMUM DIMENSION INTERMEDIATE ITS ELECTRODES
Filed June 18, 1964

INVENTORS
P. W. ANDERSON
A. H. DAYEM
BY George S. Indig
ATTORNEY 3,335,363

SUPERCONDUCTIVE DEVICE OF VARYING DIMENSION HAVING A MINIMUM DIMENSION INTERMEDIATE ITS ELECTRODES

Philip W. Anderson, New Vernon, and Aly H. Dayem, New Providence, N.J., assignors to Bell Telephone Laboratories, Incorporated, New York, N.Y., a corporation of New York Filed June 18, 1964, Ser. No. 376,079
7 Claims. (Cl. 324—43)

Figure 1:
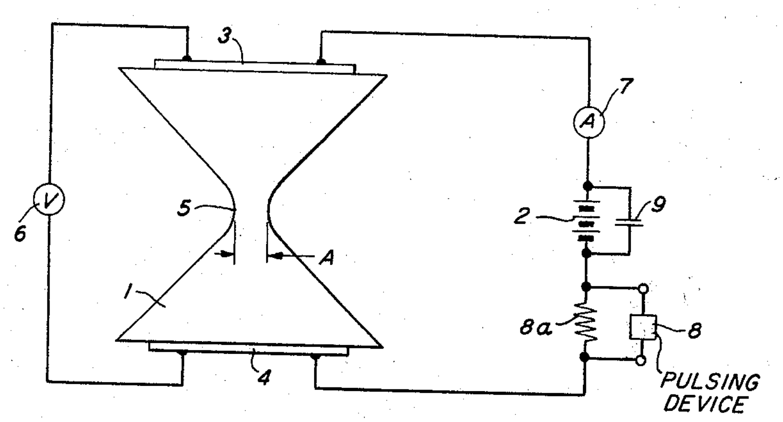

This invention relates to a field-sensitive superconducting structure and to devices utilizing same. Uses for such devices include field detection and switching.

Fundamental studies on the Josephson tunneling effect (Physics Letters, volume 1 (1962), page 251) have led the inventors to a series of studies on a superconducting bridge circuit. This structure, more precisely defined in the body of the description, is merely a layer of the superconducting material with means for introducing a current flow and having a constriction normal to such flow direction. In one of its embodiments it may be represented as two triangular portions of superconductor coming together point to point with electrode contacts on a side of each triangle opposite the contacting vertex.

It has been observed, for example, that the structure has a hysteresis loop in its I–V characteristic, so giving rise to its use as a switch or memory element. Voltage bistability so evidenced is at zero volt (in the superconducting state) and at some finite value, depending on structure among other parameters, ranging from microvolts to millivolts. This device, which is expeditiously current-biased at some level intermediate the two current values of the loop, may be switched, for example with D-C current pulses of positive or negative value at least equal to the difference in voltage between the bias level and the top or the bottom of the loop. Such pulses may be introduced conductively or inductively and may result in switching times of the order of nanoseconds or less. In view of its extreme magnetic field sensitivity, the device may also be switched to its high voltage value with low magnetic field intensity.

Certain of the observed manifestations of the subject bridge structure are postulated as being due to the generation of a vortex under the influence of applied field and D-C conductive current at one side of the constriction of the bridge and subsequent passage of such vortex across the constriction due to Lorentz forces. While the structure and postulated mechanism are distinctly different from those studied by Josephson, the effect is directly analogous to the radio frequency effect described by him. The vortices caused to traverse the bridge in this manner are thermally excited in a random manner and are synchronized by application of an A-C field, so showing up as steps representing fundamental and harmonic frequencies on an I–V characteristic. Use of the device as a field detector is so suggested. Maximum sensitivity, obtained by an electric or magnetic field direction resulting in an induced current parallel to the D-C current, may range from $10^{-7}$ to $10^{-8}$ watt and extends over a broad frequency range including that corresponding with the energy gap for the particular superconductor and beyond. Maximum frequencies so indicated may be of the order of hundreds of kilomegacycles. Determining the frequency of the applied field is a simple matter requiring only one $\Delta V$ value between any two successive steps on the I–V characteristics. The frequency may then be calculated directly from this value. Additionally, the device may be calibrated so as to indicate power level.

Application of a magnetic field having a component perpendicular to the plane of the bridge at the constriction has a measurable effect, again seen on the I–V characteristic and, consequently, such fields may be measured by this device providing values are below that required to drive the structure normal.

In accordance with this invention, there is described a bridge structure of a superconducting material. Provision is made for current flow in the bridge through a constriction, such constriction so designed as to provide a uniquely short path normal to the direction of current flow in the plane of the structure. Thickness and size generally may be varied over broad limits to provide, for example, desired current capacity, field sensitivity, and the like. The structure is considered particularly useful as a switching or memory element and as a field detector, in which latter use it may directly measure frequency and power level. Preferred embodiments of this invention are, in consequence, directed to such devices.

Figure 2:
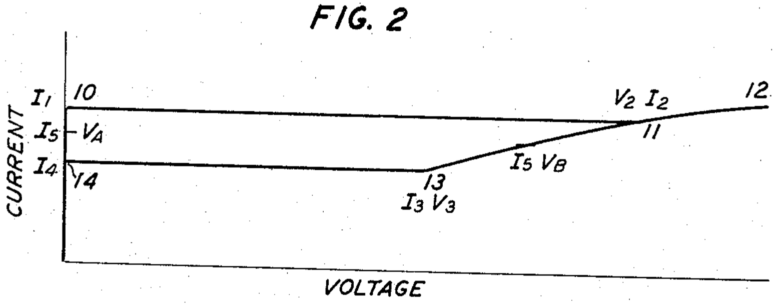
Figure 3:
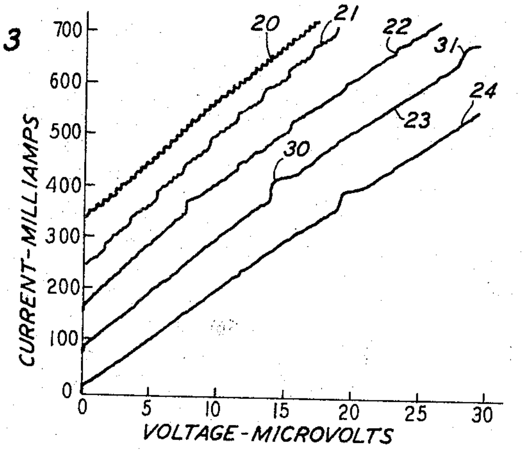

Description of the invention is expedited by reference to the drawing, in which:

FIG. 1 is a plan view of a superconducting bridge, together with associated circuitry;

FIG. 2, on coordinates of current in milliamperes and voltage in microvolts, is an I–V characteristic for a typical bridge herein in the absence of applied field; and FIG. 3, on coordinates of current in milliamperes and voltage in microvolts, is a plot of typical I–V characteristics for five different applied fields of differing frequencies.

Referring again to FIG. 1, the device shown consists of superconducting bridge 1 and D-C current source 2, so arranged as to cause current flow between electrodes 3 and 4 in a direction normal to constriction 5. Bridge 1 may be made of any superconducting material. Choice will depend on the desired temperature of operation (operation is below the absolute crititcal temperature $T_c$). The nature of the constriction is such as to provide a uniquely short path of narrow width at a direction desirably normal to current flow in the plane of the structure. It is preferred that the configuration be such that the width of the bridge constantly increases along paths parallel to the minimum width at least to a path spaced from the minimum dimension by one-half that dimension, at which position the path length should be at least twice the minimum. In FIG. 1, treating the width dimension of constriction 5 as A, a parallel dimension spaced one-half A from A should be at least 2A in length.

As to the absolute width of the constriction, minimum and maximum values are fixed by practical considerations, as, for example, desired current-carrying capacity, field sensitivity, and the like. The described manifestations occur, in principle, for a minimum dimension barely sufficient to provide electrical continuity across the bridge, that is, one atom in width. Increasing the width of the constriction portion of the bridge generally results in increased magnetic field sensitivity. The thickness of the bridge may be small, limited again by the minimum dimension assuring conductivity and may be produced by condensation techniques such as vapor deposition, sputtering, and the like, or may be of any increased dimension such as to provide the required current-carrying capacity. The remainder of this structure beyond a distance of the order of one-half the constriction width from the constriction is not critical. Its size and shape are conveniently adapted to making electrode contact and/or to couple to any radio-frequency fields relevant to the operation of the device. For certain device applications, as, for example, in switching, a constriction width of from one to ten microns in a film of the order of a few microns has been found suitable providing for for switching currents of the order of milliamperes. The circuitry of FIG. 1 also includes current measuring means 7, voltage measuring means 6, pulsing means 8, and associated resistor 8*a*, and bypass capacitor 9. This circuitry is used in obtaining a device based on the hysteresis loop of FIG. 2.

It has been noted that any of the devices herein must at some time or in some part be in the superconducting state, so suggesting a maximum operating temperature equal to $T_c$. Obviously, this temperature must be reduced to the extent necessary to maintain superconductivity, with passage of current at the desired level.

All of the devices of this invention contemplates the passage of D-C current conductively through the bridge in a direction normal to the constriction. This requires electrodes such as 3 and 4 of FIG. 1. In general, usual printed circuit techniques may be used, resort being had to silver paste, evaporated gold, evaporated aluminum, etc.

The I–V characteristic of FIG. 2 includes a hysteresis loop which is the basis for the switching and memory applications to which reference has been made. Coordinates are current in milliamperes on the ordinate and voltage in microvolts on the abscissa. Starting with zero current, zero voltage at the origin, the current is increased to a value of $I_1$ at 10, which for the particular conditions of no impressed field and for the temperature, structure and material chosen, is the limiting current for the superconducting state. Subsequent increase results in a value of $I_2$ at 11 only slightly greater than $I_1$ at some large voltage value $V_2$. If voltage is further increased, current increases. Further increasing voltage results in an increasing current on the near straight line portion of the characteristic 11–12, which defines a "resistive superconducting state" and is approximately parallel to the slope of the normal material. Reducing voltage or current to a value below that defined by point 11 results in an extension of line portion 11–12 to position 13 ($I_3V_3$). Further decrease brings the material back to its truly superconducting state at point 14, so defining a finite current value $I_4$ at zero voltage.

The hysteresis loop so defined in FIG. 2 may be utilized by D-C biasing the device, such as bridge 1 of FIG. 1, to some value of current $I_5$ between $I_1$ and $I_4$ by means, for example, of D-C bias source 2 of FIG. 1. The zero voltage at this position is designated $V_A$. The device may then be switched to the corresponding finite voltage $V_B$ at current value $I_5$ on the other side of the loop by a D-C pulse (in the direction of D-C current) through the device of current amplitude at least equal to $I_1$ minus $I_5$. Considering $V_B$ to define the one position or storage position, the device may be switched off by a reverse or negative pulse of current amplitude of a minimum value equal to $I_4$ minus $I_5$.

The values of bias current and $V_B$ may be tailored by properly choosing the dimensions of the bridge, the material of which the bridge is made, and the operating temperature. It is apparent that use of superconductors having successively higher values of $I_c$ (critical current), larger constriction dimensions, and lower temperature all result in increasing bias current. Higher values of $V_B$ are achieved by increasing the normal state resistivity through the constriction. This may be accomplished by decreasing the constriction dimensions, either in the plane of the device or normal thereto. Of course, such parameters may be varied also by use of appropriate related circuit elements.

The plot of FIG. 3 illustrates use of the bridge as a field detector. The specific coordinate values shown are for a 300 Angstrom thick tin film bridge having a constriction three microns wide operating at a temperature one percent of the absolute temperature below $T_c$ for this film (or at a temperature of about 3.7 degrees Kelvin). The I–V characteristics shown as curves 20 through 24 result from detection of field frequencies of 0.28, 0.94, 3.8, 6.8, and 9.25 kilomegacycles, all at a power level of approximately 10 microwatts. The value of the applied frequency may be determined from the relationship $h\nu=2eV$, in which $h$ is Planck's constant, $\nu$ is frequency in cycles per second, $e$ is the electron charge in coulombs, and V is the D-C voltage across the bridge. Taking, for example, curve 23 and considering the step defined by points 30–31, in this instance the difference in voltage between points 30 and 31, substituting in the equation above, it is seen that the voltage results in a frequency value of 6.8 kilomegacycles. Since each of the curves shown steps up in current with increasing power of the applied field, the detector may easily be calibrated to indicate power level.

The invention has been described in terms of a limited number of exemplary device applications. Variations in operating conditions, configuration, etc. have been noted. So, for example, it has been indicated that switching utilizing the characteristic of FIG. 2 may be accomplished by use of induced currents. For maximum effect, such induced currents are in the direction of the D-C current path defined by the electrodes, although any source resulting in an induced current having a component in such direction will suffice. Induced currents may be produced by use of electric or magnetic fields in the appropriate directions. Use of an applied magnetic field in a direction normal to the plane of the bridge at the position of the constriction may only switch the device to the on or finite voltage position. Removal does not switch the device to the off position. This manifestation has obvious applications. It has been noted that the device is extremely magnetic field-sensitive, so suggesting its use as a magnetic field detector. The appended claims should be construed accordingly.

What is claimed is:

1. Device comprising a body of superconducting material, together with electrodes for defining a current path therethrough, the said body being of a varying dimension normal to the said path on a given plane, the said dimension attaining a minimum value at a point intermediate the said electrodes, the said dimension being at a value greater than the said minimum at every other point intermediate the said electrodes in which each of the said electrodes is at a distance from the said point defining the minimum dimension of at least one-half the said dimension and at which the dimension spaced one-half of the minimum dimension distant from the said point is at least twice the said minimum.

2. Device of claim 1, in which the said body is a layer on a substrate.

3. Device of claim 1, together with D-C biasing means for providing current values through the said body between the said electrodes.

4. Device comprising a body of superconducting material, together with electrodes for defining a current path therethrough, the said body being of a varying dimension normal to the said path on a given plane, the said dimension attaining a minimum value at a point intermediate the said electrodes, the said dimension being at a value greater than the said minimum at every other point intermediate the said electrodes, together with D-C biasing means for providing current values through the said body between the said electrodes in which the said means results in a bias current value intermediate the minimum and maximum current values of the current-voltage hysteresis loop for the material, together with means for switching the device between a zero voltage position and a finite voltage position on the said loop.

5. Device of claim 4 in which the said switching means is a current pulse source.

6. Device of claim 1 in which the said minimum dimension is from one to ten microns.

7. Device of claim 1, together with voltage and current measuring means to detect change in such parameters with applied field.

References Cited

UNITED STATES PATENTS

| | | | |
|---|---|---|---|
| 2,989,714 | 6/1961 | Park et al. | 307—88.5 |
| 3,049,686 | 8/1962 | Walters | 340—173.1 |
| 3,093,754 | 6/1963 | Mann | 307—88.5 |
| 3,125,688 | 3/1964 | Rogers | 307—88.5 |
| 3,207,921 | 9/1965 | Ahrons | 340—173.1 |

RUDOLPH V. ROLINEC, *Primary Examiner.*

RICHARD B. WILKINSON, *Examiner.*

R. J. CORCORAN, *Assistant Examiner.*